Nov. 14, 1950  H. C. ROTERS  2,530,131
DYNAMIC BRAKING CONTROL SYSTEM
Filed March 11, 1948  3 Sheets-Sheet 1

INVENTOR
HERBERT C. ROTERS
BY
ATTORNEY

Nov. 14, 1950 — H. C. ROTERS — 2,530,131
DYNAMIC BRAKING CONTROL SYSTEM
Filed March 11, 1948 — 3 Sheets-Sheet 2
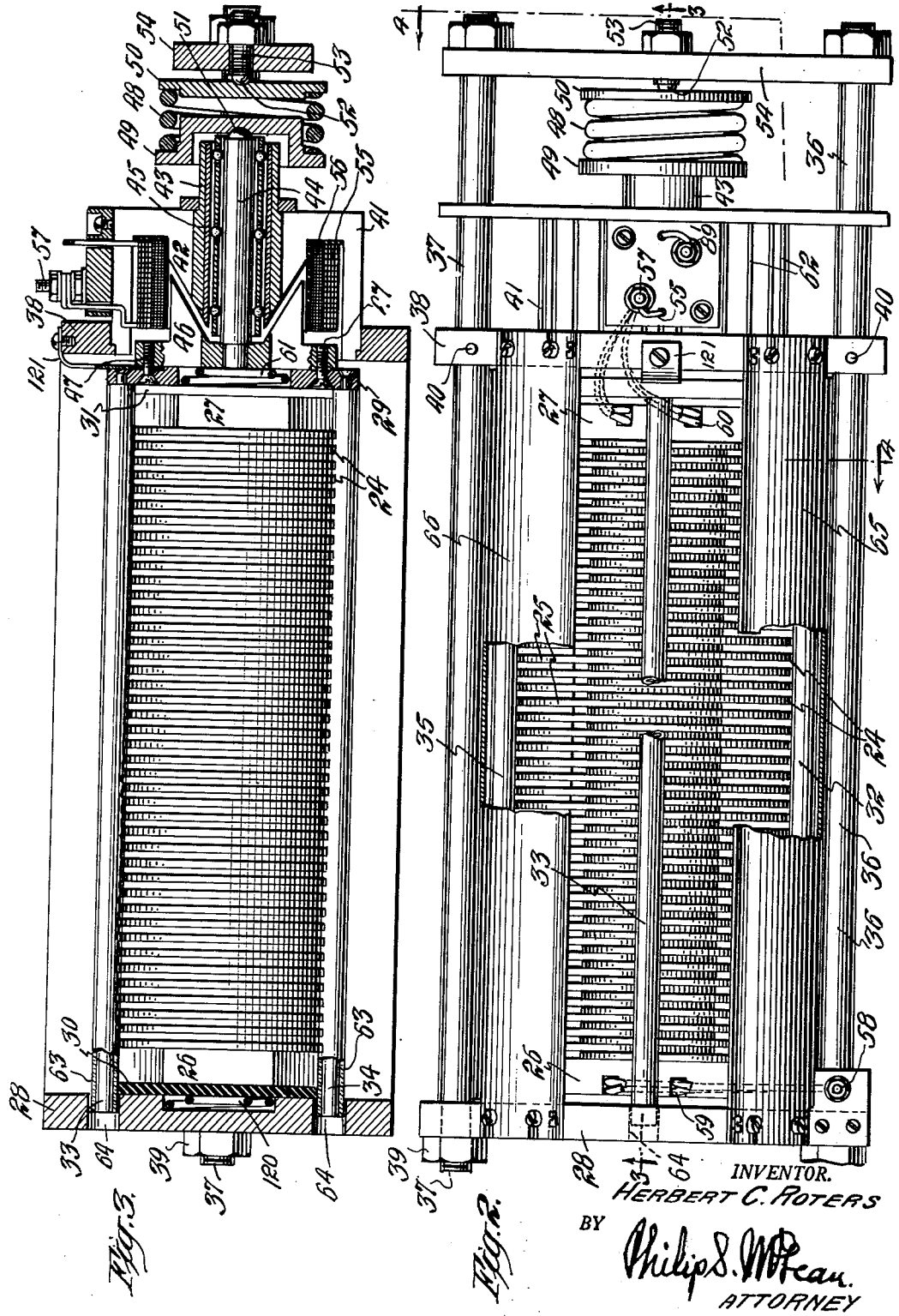
INVENTOR.
HERBERT C. ROTERS
BY
Philip S. McLean
ATTORNEY

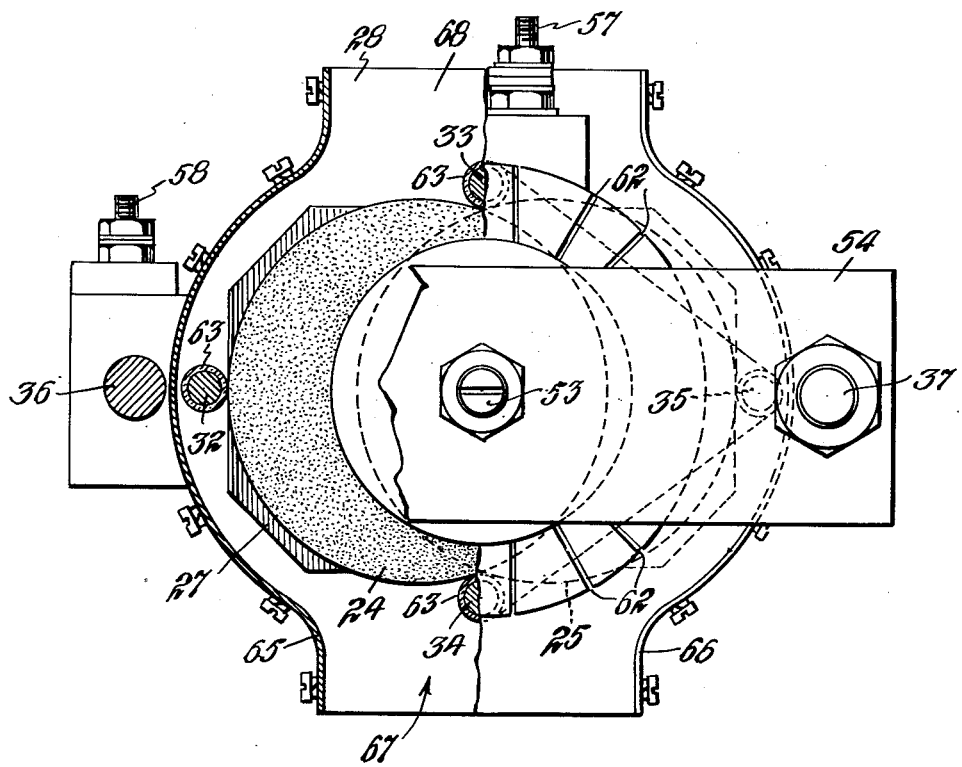

Patented Nov. 14, 1950

2,530,131

UNITED STATES PATENT OFFICE 2,530,131

DYNAMIC BRAKING CONTROL SYSTEM

Herbert C. Roters, Kew Gardens, N. Y., assignor to Beech Aircraft Corporation, Wichita, Kans., a corporation of Delaware Application March 11, 1948, Serial No. 14,333

17 Claims. (Cl. 318—261)

The invention here disclosed relates to electric control systems of the type using dynamic braking.

Because of the high braking rates involved, dynamic braking theoretically has many advantages for present day high-speed electrically driven vehicles such as trolley cars, trolley buses, Diesel-electric, gas-electric driven vehicles, travelling cranes and the like.

As heretofore designed, dynamic braking has involved certain disadvantages, particularly in the complication of necessary control and contacting equipment and in requiring multistep dynamic braking resistors and momentary exciting of the field of the dynamic braking motor to build up the residual for fast braking.

General objects of the present invention are to simplify, improve and render more effective, dynamic braking systems and to provide a system of this character which will meet all the standards and requirements of present day high performance.

Particularly it is a purpose of the invention to eliminate the need for multistep dynamic braking resistors and the momentary exciting of the field mentioned above.

Especially it is an object of the invention to accomplish transition from motor action to dynamic braking action by simple change of motor contactors from forward to reverse position and to effect practically instantaneous build-up of the dynamic braking current without the necessity of momentarily exciting the field.

Special objects, also, are to automatically control a dynamic braking resistor to effect immediate build-up of the series generator and to limit the current to safe values.

An important object of the invention, as applied to automative vehicles, is to simulate the usual engine braking effect accomplished by release of pressure on the accelerator pedal.

Further, it is an object of the invention to regulate the simulated engine braking to any desired magnitude and to accomplish this at the higher generator speeds to prevent commutator difficulties.

Other special objects of the invention are to obtain braking effort above the simulated value of engine braking, under control of a foot pedal or the like, and to accomplish application of friction or hydraulic brakes at the end of the foot pedal stroke to secure the effect of positive mechanical braking for coming to a full stop.

A further important object of the invention is to provide satisfactory dynamic braking for any number of motors, such as the independently operating motors provided in a four-wheel drive transport vehicle.

The foregoing and other desirable objects are attained, as will be apparent in the course of the following specification, through certain novel features of construction, combinations and arrangements of parts, all as hereinafter set forth and broadly claimed.

The drawings accompanying and forming part of the specification illustrate a practical embodiment of the invention. Structure and arrangement, however, may be modified and changed in various ways, all within the true intent and broad scope of the invention as hereinafter defined and claimed.

Fig. 1 in the drawings is a wiring diagram of the system as designed for a four wheel drive vehicle power plant.

Fig. 2 is a top plan view of one of the dynamic braking resistors.

Fig. 3 is a broken part longitudinal sectional view of a resistor, as on substantially the line 3—3 of Fig. 2.

Fig. 4 is a partial end and horizontal cross sectional view of the resistor, the sectional portion appearing as on substantially the line 4—4 of Fig. 2.

Figure 1:
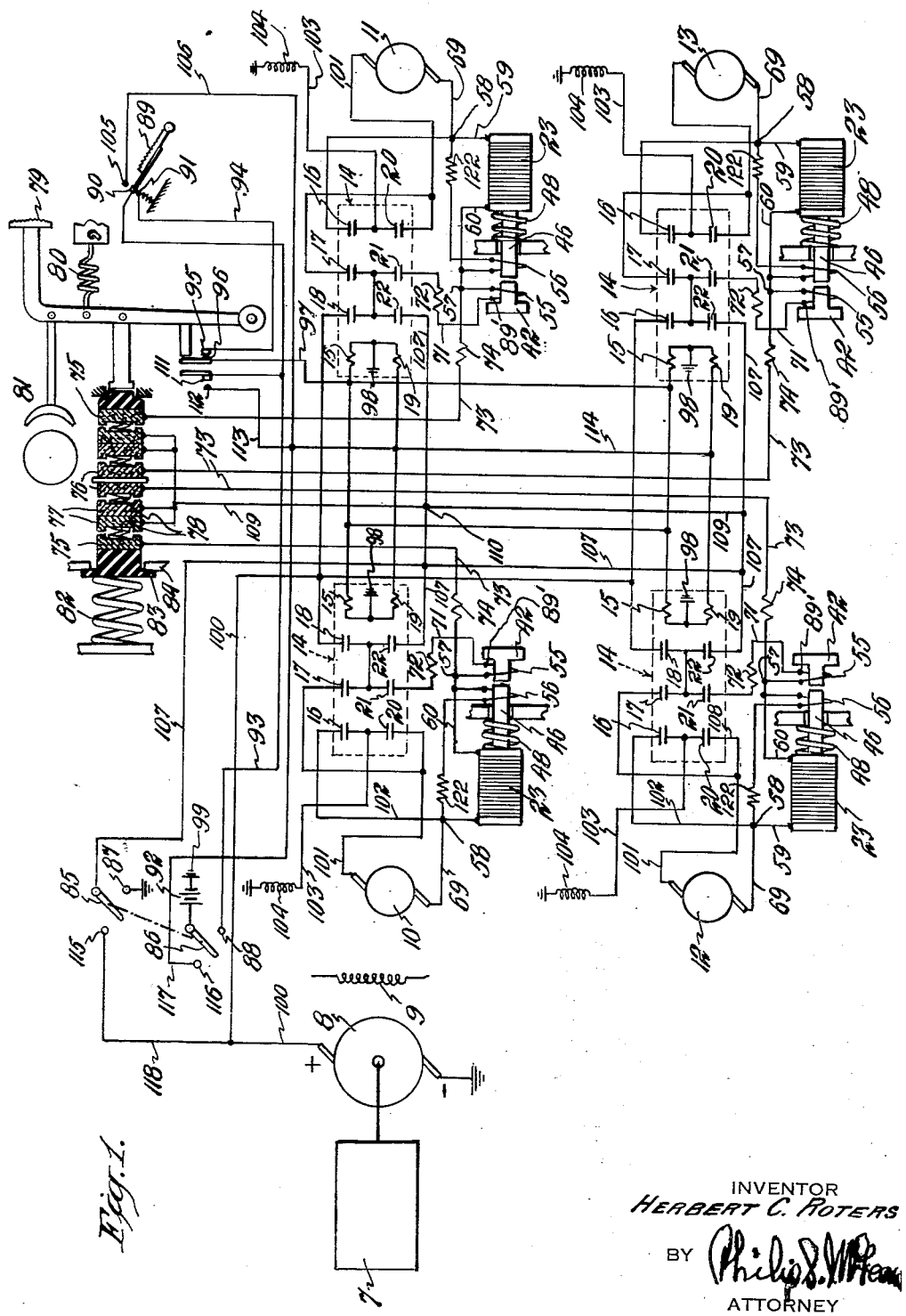

In the four wheel drive system illustrated in Fig. 1, power is supplied by an internal combustion engine 7 operating a D. C. generator 8 having a suitably controlled field 9. This generator furnishes current to the four series motors 10, 11, 12, 13 geared to the wheels of the vehicle. These motors are arranged in parallel so that description of connections for one will suffice for all.

Each motor is under control of a triple pole double throw electromagnetically actuated contactor indicated generally at 14.

Each contactor unit has a magnet 15 for closing the set of upper contacts 16, 17, 18 for forward drive and a magnet 19 for closing the lower set of contacts 20, 21, 22 for reverse drive and for dynamic braking.

A solenoid controlled dynamic braking carbon pile represented at 23 is arranged to be connected in series with its associated motor whenever the control contactor goes into reverse.

Details of the carbon pile resistors are shown in Figs. 2, 3 and 4.

Each resistor consists essentially of a stack of carbon discs alternately offset laterally as indicated at 24, 25, and disposed in overlapping relation to the extent indicated in Fig. 4 between end terminal blocks 26, 27, Fig. 3, of carbon or the like, supported by end plates 28, 29 but insulated from the latter through intervening plates of insulation 30, 31.

The carbon discs are loosely supported in their staggered relation, those at the left in Fig. 4 on guide rods 32, 33, 34, arranged with their centers as an equilateral triangle and those at the right similarly positioned between rods 33, 34 and 35, disposed as an equilateral triangle at the opposite side of the structure. This construction holds the discs definitely in place, permitting them, however, necessary axial freedom. The four guide rods are of insulating material or sheathed in insulating material, the insulating sheathing or tubes 63, facilitating free sliding movement of the discs on the rods.

A rigid frame is provided by connecting the end plate 28 through two side rods, 36, 37, with a companion opposed frame plate 38. These side or stay rods 36, 37 are shown secured fast to end plate 28 by nuts 39 and secured fast to the end head or plate 38 by through pins 40.

The fixed frame plate 38, as shown in Fig. 3, forms a support for the shell 41 of the solenoid and for the fixed portion 42 of the solenoid core.

A liner 43 within the stationary core portion of the solenoid supports the armature guide rod 44 through the intermediacy of a ball bearing sleeve 45.

The movable core portion or armature element 46 is fixed on the armature guide rod 44 and attached by screws 47 or the like to the movable carbon pile pressure plate 29.

Pressure is applied to the stack of carbon discs by a spring 48 shown held between cups or washers 49 and 50, the first engaging the rounded end of the armature guide rod at 51 and the second engaging the rounded inner end 52 of a set screw 53 mounted in the cross piece 54 secured over the ends of the tie rods 36, 37.

The solenoid is made up in the illustration of series and shunt connected coils 55, 56 respectively.

The series coil 55 is connected directly with one end terminal 57 of the pile so as to carry the entire current which passes through the carbon discs.

The shunt coil 56 is connected across the terminals 58 and 57, of the pile, the latter being connected with the carbon terminal blocks 26 and 27 as by means of flexible copper leads, 59, 60.

In the absence of current through the series coil 55, the full force of the spring 48 is effective to compress the pile to give it a low resistance. When this coil is energized the movable plunger, core or armature section 46 is attracted toward the stationary core section 42, reducing the force compressing the carbon pile and thereby increasing its resistance.

Springs 61 and 120 are shown interposed between the armature 46 and the insulating plate 31 and between the end plate 28 and insulator 30 to maintain a minimum compression force on the carbon discs in the event the excitation of the solenoid is strong enough to carry the armature 46 into engagement with the fixed pole piece 42, which latter would have the effect of nullifying the pressure of spring 48 on the pile. Springs 61 and 120 in such case thus prevent the carbon discs from actually separating and forming arcs.

The shunt coil 56 is wound to supplement the action of the series coil 55 but only becomes effective when there is a relatively high voltage across the pile.

In order that the resistance of the pile be highly responsive to changes in current through the solenoid coils, the inertia of the moving parts is reduced to a minimum in the structure illustrated and the friction of these parts is kept as low as possible. To further aid in making the solenoid instantly responsive to current in the coils, the stationary and movable core or armature elements 42 and 46 may be slotted as indicated at 62.

The guide rods 32, 33, 34, 35 for the discs, with their insulating tubes 63 of Pyrex glass or other suitable material are fixed in the movable end head 29 and free to slide at 64 in the fixed end head 28.

The entire movable plunger system, including armature element 46, pressure plate 29, carbon terminal block 27, plus half the weight of the pile and half the weight of the guide rods are carried by the armature guide rod 44 riding in the ball bearing sleeve 45, thus keeping friction to a minimum.

The fixed end plates 28 and 38 are shown as carrying shield covers 65, 66, spaced to form an air duct about the discs, open at the bottom to receive an air blast at 67 and open at the top at 68 for discharge of the same. This current of cooling air may be furnished by a fan driven from the engine so as to be available so long as the engine is in operation or may be supplied, for example, by an electric motor driven fan.

In the wiring diagram, the terminals 58 of the carbon piles are shown connected directly with the armatures of the motors 10, 11, 12 and 13 by wiring 69 and the other terminals 89' from the series coils are shown connected by wiring 71 through resistors 72 with the reverse contacts 21.

Wire connections 73, including resistors 74, are shown extending from the carbon pile terminals 57 to the outermost and innermost carbon terminal blocks 75 and 76, respectively, of a pedal brake carbon pile. Interconnected carbon blocks are shown at 77 interposed between the end and intermediate blocks 75 and 76 held normally separated from the latter by interposed springs 78.

This auxiliary carbon pile is shown operable by a foot pedal 79 which if actuated hard enough to overcome the force of spring 82, may apply the mechanical brake at 81, the carbon pile yielding as a unit to effect the latter result being supported at the back by a spring 82 whose effective force is present so that it yields only when the resistance between the carbon terminal blocks 75—77, etc., has been reduced to a predetermined value.

When operating in the forward direction, interconnected switches shown at 85, 86, are positioned by a "forward" control button or the like so as to close circuits at the stationary terminals 87, 88. Then when the accelerator pedal or speed control member 89 is depressed, the relatively movable and stationary contacts 90, 91, will be engaged to complete circuits as follows:

From the battery 92, switch arm 86 and contact 88, by wire 93, contacts 90, 91, and wire 94, contacts 95, 96, and wire 97 to the forward magnet coils 15 of the four contactor units, the circuit being completed through a common return such as provided by the grounds indicated at 98, 99. The contactors are thus energized to close the upper set of forward switch contacts 16, 17, 18. The generator will then furnish current through connections 100 and by way of closed switch contacts 18, 17, and conductors 101 to the armatures of the motors and by wiring 69 and 102 and switch contact 16 and wiring 103 to the fields 104 of the motors and ground. All four motors will thus be energized to operate in the forward drive direction.

If pressure on the accelerator or speed control member 89 is released, the circuits for the forward contactor magnets 15 will be opened at the contacts 90, 91, beneath the accelerator pedal, resulting in opening of the forward drive switch contacts 16, 17, 18, thus interrupting supply of current to the motors.

With release of pressure on the accelerator pedal the moveable contact 90 will engage a stationary back contact 105 which through connections 106, 114, will result in the energizing of the reverse contactor magnets 19. This, then, results in the closing of the lower set of reverse drive and dynamic braking contacts 20, 21, 22. Circuits are thereby completed, starting at the grounded contact 87, switch arm 85 and wiring 107 through the closed contacts 22 and 21 through the series coils 55 and through the carbon piles connected therewith, by way of wiring 69 to the armatures of the motors and wiring 101, 108, closed contacts 20 and wiring 103 to fields 104 and ground.

This current, it will be seen, flows through the motor fields 104 in the same direction as the current when the motor was operating from the generator. Under such conditions the current flowing will supplement the residual flux of the fields 104 and thus cause the motors to build up as series generators, with the direction of the armature current reversed.

Whether or not a series generator connected as described will build up from the residual voltage produced by the residual field depends upon the over-all resistance of the armature circuit including the external portions such as the contacts 20, 21, 22, the resistance 72, the series coil 55 and the carbon pile. When this machine commences to build up as a generator, the current is at low value and hence the carbon pile will be fully compressed by the spring 48. The resistance of the pile, therefore, will be at a minimum.

Above a minimum critical speed the current will build up rapidly, energizing the series coil 55 and the shunt coil 56 also to the extent of the voltage across the pile terminals 57, 58. One supplementing the other, the magnetomotive force of the two coils will cause the moving plunger or core to counter-balance to some extent the force of the spring 48, thus to lessen the pressure on the discs and permit the pile resistance to increase accordingly. At a particular value of pressure on the discs equilibrium will be established between the spring force in one direction and the solenoid and pile forces in the opposite direction and the dynamic braking current obtained will become constant for that particular speed.

For low values of voltage across the carbon pile, where the shunt coil 56 is relatively ineffective, the equilibrium current of the carbon pile will be determined by the turns on the series coil 55. Therefore, if it is desired to have the current come to equilibrium at a relatively low value, the turns of the series coil are made relatively many, while if it is desired to stabilize the circuit at a higher value of current the turns of the series coil are made fewer. In this manner equilibrium current for the low speed range is determined by the turns of the series coil.

At high motor speeds the voltage across the carbon pile will be relatively high and the shunt coil will become more effective, causing equilibrium to occur at a lower value of current than at low speeds. The speed at which the shunt coil markedly affects the equilibrium characteristic is determined by the relative number of turns and resistance. Thus a shunt coil having relatively few turns and low resistance will become effective at a low speed, while one having a larger number of turns with higher resistance will be effective at a much higher speed. Thus the characteristic shape of the dynamic braking current curve from low to high motor speeds may be controlled by varying the relative values of the series and shunt turns of the solenoid coils.

Generally it is desirable to select these values to have the braking current drop away at high motor speeds to relieve the commutating difficulty of the generator, which becomes greater with higher speeds.

The braking operation obtained as described is comparable with that obtained upon removing pressure from the accelerator pedal of an ordinary internal combustion engine driven vehicle and is referred to herein as simulated engine braking.

When it is desired to obtain braking in excess of the simulated engine braking the brake pedal 79 may be used. Pressure on this pedal causes the carbon blocks 75, 76, 77, to engage and these then, through connection 109 to terminal 110, wire 107, closed reverse switch contacts 22, 21 and resistance 72 and connections 73 and resistance 74, form shunts around the series coil 55 at the terminals 110 and 57. These shunts divert current away from the series coils in the inverse ratio of the resistance of the shunt circuits across terminals 110, 57, to the resistance of the series coil circuits across such terminals. This will cause the carbon pile to come to equilibrium at a much higher value of dynamic braking current.

The increase in this current will be determined by the pressure on the brake pedal 79 and with heavy pressure the division of current will be determined almost entirely by the ratio of the resistance 74, including the leads 73 and 109 to the carbon terminal blocks 75, 76, 77 and that of the series coil circuit across the terminals 110, 57.

Under these conditions maximum dynamic braking will be obtained and the exact value of current will be determined by the motor speed. At intermediate speeds the braking current will be substantially increased, while at higher speeds the increase will be relatively smaller because of the predominating effect of the shunt coils 56.

With application of braking pressure sufficient to overcome the force of spring 82, the mechanical brake 81 will be applied and this may be used to bring the vehicle to a stop and to hold it.

It will be noted that even if the brake pedal is operated while the accelerator pedal is held down, the normal dynamic braking will be effected. This is so because as the brake pedal 79 is depressed it will separate the contacts at 95, 96, to interrupt the circuit for the forward contactor magnets 15, and with slight further movement, close contacts at 111, 112, to energize the reverse contactor magnets 19 through connections 113—114 for applying the dynamic braking.

When it is desired to run the motors in the reverse direction, the interconnected switches 85, 86, are thrown to the reverse position to establish connection with contacts 115, 116. This will accomplish actuation of the reverse magnets of the contactors regardless of whether the accelerator pedal is operated, through circuit from the battery 92, switch arm 86, contact 116 and wires 117—114 to reverse magnets 19.

Current will then flow from the generator through wiring 100—118, contact 115, switch arm 85 and wiring 107 through closed reverse contacts 22 and 21, through the series coils 55 and carbon piles and motor armatures and by connections 101, closed reverse contacts 20 and connections 103 through the fields 104 to ground. Thus, the current direction through the motor armatures and fields is the same as it was under dynamic braking conditions.

If while running in reverse the brake pedal 79 is pressed, only the mechanical brake 81 will be effective, the dynamic braking being then inoperative.

The purpose of resistors 72 in series with the series coils 55 and resistors 74 in series with the foot brake carbon blocks 75 and 77 is to provide definite minimum resistance in each of these two parallel paths so that slight variations caused by changes in the contact resistance of the connections and the contact resistance of the carbon terminal blocks will not seriously affect the maximum diversion of the current from the main series coils 55 when maximum foot pressure is applied to the carbon terminal blocks.

If desired, a biasing spring may be connected with the reverse contactors 20, 21, 22, to cause the circuit at these contacts to be automatically closed in the event of a power failure from the battery 92 so that dynamic braking will be made automatically effective under all conditions of forward driving.

While the movable end of the pile compressing mechanism made up of the head 29, armature 46 and guide rod 44, Fig. 3, is free to move longitudinally, it is restrained against axial or rotary motion, in the illustration, by a flat spring 121 connected between the stationary frame plate 38 and the pile compressing plate 29.

With the combination disclosed the braking on different wheels is substantially equalized because the wheel driving motors in operating as generators act independently of each other and so prevent one from assuming the entire load. Also, the resistors 72 and 74 in the series and shunt coil circuits tend to equalize the maximum braking effort of each motor-generator.

To keep the shunt coil ampere turns independent of the temperature of the coil, this coil may be designed of relatively low resistance and have an external resistance of zero temperature coefficient connected in series with it, as indicated at 122 in Fig. 1.

The invention enables a vehicle to be driven in the customary manner. Speed may be controlled by the degree of pressure on the accelerator pedal 89 and with removal of such pressure simulated engine braking becomes effective. This first or automatic range of dynamic braking, because of the design disclosed, will come into action at relatively low road speeds. Increased and controlled dynamic braking is accomplished through pressure on the brake pedal 79 which first acts to close the shunt pile 75, 76, 77, and thereafter to shift the shunt pile as a unit to apply mechanical or hydraulic brakes, for example, 81.

The invention is of broad scope and adapted to many uses.

What is claimed is:

1. A dynamic braking control system comprising a series motor and means for switching said motor to generator action including a variable resistance load across the terminals of the same of low enough value to make the total circuit resistance less than the critical resistance of the machine operating as a generator to thereby enable quick build-up of the machine as a generator without field boosting and said resistance load including means for adjusting the same to a minimum when initially introduced and for automatically increasing resistance of the same under influence of the current generated to limit the current to a predetermined value.

2. A dynamic braking control system comprising in combination a prime mover, a D. C. generator operated thereby, series motors operated from said generator, contactors for controlling current supply from said generator to said motors and conversion of said motors to generator action, variable resistance loads for said motors of low enough value to make the total circuit resistance less than the critical resistance of the motors operating as generators to enable quick build up of said motors as generators and means associated with said resistance loads for effecting connection of said variable resistance loads with said motors when operating as generators at minimum value and for automatically increasing resistance of the same according to the current generated to limit current to a predetermined value.

3. In a dynamic braking control system, the combination of a series motor, means for switching said motor to generator action, a variable resistance load arranged to be connected across the terminals of said motor and having a minimum resistance value low enough to keep the total circuit resistance less than the critical resistance of the motor operating as a generator to enable build up of the machine as a generator and means for effecting connection of said variable resistance load at minimum value with said motor when operating as a generator and for automatically increasing resistance of said resistance load according to the current generated to hold the current to predetermined values.

4. A combination as in claim 3 in which the resistance load comprises a carbon pile compressed by a spring and the resistance controlling means comprises a magnet arranged to modify the compression effect of the spring under the influence of the current generated in series with the carbon pile.

5. A combination as in claim 3 in which the resistance load comprises a carbon pile under compression of a spring force and in which the controlling means includes series and shunt coils for modifying the effective spring force with the first coil connected in series with the carbon pile for controlling the magnitude of the current for the low speed range of the motor operating as a generator and the second coil connected in shunt with the pile for controlling current in the high speed range of generator operation.

6. A combination as in claim 3 in which the resistance load comprises a carbon pile under compression of a spring force and in which the controlling means includes series and shunt coils for modifying the effective spring force with the first coil connected in series with the carbon pile for controlling the magnitude of the current for the low speed range of the motor operating as a generator and the second coil connected in shunt with the pile for controlling current in the high speed range of generator operation, a second carbon pile shunting said series coil and operator controlled to divert current away from said series coil to raise the upper current limit for said first-mentioned carbon pile.

7. A combination as in claim 3 in which the resistance load comprises a carbon pile under compression of a spring force and in which the controlling means includes series and shunt coils for modifying the effective spring force with the first coil connected in series with the carbon pile for controlling the magitude of the current for the low speed range of the motor operating as a generator and the second coil connected in shunt with the pile for controlling current in the high speed range of generator operation, a second carbon pile shunting said series coil and operator controlled to divert current away from said series coil to raise the upper current limit for said first-mentioned carbon pile and a mechanical brake arranged to be actuated under the extreme limit of operation of said second carbon pile.

8. A combination as in claim 3 in which the resistance load comprises a carbon pile under compression of a spring force and in which the controlling means includes series and shunt coils for modifying the effective spring force with the first coil connected in series with the carbon pile for controlling the magnitude of the current for the low speed range of the motor operating as a generator and the second coil connected in shunt with the pile for controlling current in the high speed range of generator operation, a second carbon pile shunting said series coil and operator controlled to divert current away from said series coil to raise the upper current limit for said first-mentioned carbon pile and series resistances in said respective shunt circuits for stabilizing division of current between the same.

9. A dynamic braking control system comprising a drive motor operable when driven as a generator, means for controlling supply of electrical energy thereto and means operable on interruption of supply of energy thereto to automatically convert said motor to generator operation and connect the same with a resistance load, said resistance load including a spring closed carbon pile and magnetic means in the generator circuit for reducing the spring closing force on said carbon pile for automatically increasing resistance in accordance with the current generated.

10. A dynamic braking control system comprising a drive motor, operable when driven, as a generator, a resistance load for the motor when operating as a generator, magnetic means for controlling the magnitude of said resistance load, means for controlling supply of electrical energy to the motor and means operable on interruption of supply of energy thereto to automatically convert said motor to generator operation and connect the same with said resistance load, and an arbitrarily adjustable variable resistance in shunt with said magnetic means.

11. A dynamic braking control system comprising a drive motor, operable when driven, as a generator, a resistance load for the motor when operating as a generator, magnetic means for controlling the magnitude of said resistance load, means for controlling supply of electrical energy to the motor and means operable on interruption of supply of energy thereto to automatically convert said motor to generator operation and connect the same with said resistance load, a variable shunting resistance for said magnetic means, brake control means for adjusting said variable resistance and means operable in the course of actuation of said brake control for effecting mechanical braking action.

12. A brake control system comprising an electric motor for driving a load and operable as a generator when driven by the load, dynamic braking means including a resistance load and magnetic means for controlling the magnitude of said resistance load, means for automatically connecting said dynamic braking means with said motor when operating as a generator, variable resistance means and means for varying the resistance of and for connecting said variable resistance means in shunt with the magnetic controlling means of said dynamic braking means.

13. A brake control system comprising an electric motor for driving a load and operable as a generator when driven by the load, dynamic braking means including a resistance load and magnetic means for controlling the magnitude of said resistance load, means for automatically connecting said dynamic braking means with said motor when operating as a generator, variable resistance means and means for varying the resistance of and for connecting said variable resistance means in shunt with the magnetic controlling means of said dynamic braking means, said variable resistance means including a compressible resistor operable when compressed as a thrust transmitting element and additional braking means operable by said variable resistance when compressed to act as a thrust transmitting element.

14. In a dynamic braking system a motor having reversibly connected field and armature, a resistance load, control means for connecting said motor with a source of supply and for cutting off said motor from said source of supply including mechanism for connecting said resistance load across the motor terminals and for reversing the armature and field without reversing the flow of current through the field when the motor is driven in the same direction, said resistance load including a variable resistor and a controlling magnet therefor in shunt with said load and having a resistance factor of zero temperature coefficient.

15. A carbon pile for braking purposes comprising yieldably separated pile elements engageable under applied end pressure to afford gradually reduced resistance and eventually form a solid thrust unit, a brake applying member acting on said pile and having a range of movement to first compress and then shift the pile as a unit and means for yieldingly supporting the pile against the unitary movement referred to.

16. A carbon pile for braking purposes comprising yieldingly separated pile elements engageable under applied end pressure to afford gradually reduced resistance and eventually form a solid thrust unit, a brake applying member acting on said pile and having a range of movement to first compress and then shift the pile as a unit and means for yieldingly supporting the pile against the unitary movement referred to and brake means operable by said pile in said unitary movement of the same.

17. A carbon pile for braking purposes comprising yieldingly separated pile elements engageable under applied end pressure to afford gradually reduced resistance and eventually form a solid thrust unit, a brake applying member acting on said pile and having a range of movement to first compress and then shift the pile as a unit, means for yieldingly supporting the pile against the unitary movement referred to and pile controlling electrical connections including a switch operable by said brake applying member.

HERBERT C. ROTERS.

REFERENCES CITED

The following references are of record in the file of this patent:

UNITED STATES PATENTS

| Number | Name | Date |
|---|---|---|
| 628,967 | Van Hoevenbergh | July 18, 1899 |
| 1,177,881 | Mayer | Apr. 4, 1916 |
| 1,455,668 | Scheer | May 15, 1923 |
| 1,713,916 | Parrish | May 21, 1929 |
| 1,989,672 | Apple | Feb. 5, 1935 |
| 2,046,970 | Royer | July 7, 1936 |
| 2,078,649 | Willby | Apr. 27, 1937 |
| 2,249,857 | Schaelchlin | July 22, 1941 |
| 2,400,136 | Rady | May 14, 1946 |
| 2,408,188 | Austin | Sept. 24, 1946 |

FOREIGN PATENTS

| Number | Country | Date |
|---|---|---|
| 324,707 | Great Britain | Feb. 3, 1930 |